United States Patent [19]
Fukushima

[11] Patent Number: 5,562,541
[45] Date of Patent: Oct. 8, 1996

[54] FOLDED FLAT-SPRING AND DEVICE INTO WHICH THE FOLDED FLAT-SPRING IS INCORPORATED

[75] Inventor: Hirotaka Fukushima, Neyagawa, Japan

[73] Assignee: Kabushiki Kaisha Daikin Seisakusho, Osaka, Japan

[21] Appl. No.: 582,632

[22] Filed: Jan. 4, 1996

Related U.S. Application Data

[63] Continuation of Ser. No. 141,198, Oct. 21, 1993, abandoned.

[30] Foreign Application Priority Data

Oct. 23, 1992 [JP] Japan ................................. 4-286480
Dec. 4, 1992 [JP] Japan ................................. 4-325161

[51] Int. Cl.⁶ ............................. F16D 3/12; F16D 3/80
[52] U.S. Cl. ........................ 464/24; 192/208; 267/165; 464/84; 464/101
[58] Field of Search ............................ 464/24, 81, 84, 464/100, 101, 51, 54; 192/106.1; 267/165; 74/574

[56] References Cited

U.S. PATENT DOCUMENTS

| | | | |
|---|---|---|---|
| 1,857,679 | 5/1932 | Thomas | 464/84 |
| 1,959,213 | 5/1934 | Nygard | 464/84 |
| 2,017,591 | 10/1935 | Dumm | 464/84 |
| 2,775,105 | 12/1956 | Banker . | |
| 3,587,803 | 6/1971 | Sugiura | 267/165 |
| 4,257,510 | 3/1981 | Fisher | 464/84 |
| 4,300,670 | 11/1981 | Mathues | 192/106.1 |
| 4,911,278 | 3/1990 | Kabayama et al. | 192/106.1 |
| 5,083,981 | 1/1992 | Förster | 464/24 |
| 5,088,964 | 2/1992 | Kuhne | 464/24 |
| 5,146,811 | 9/1992 | Jäckel | 74/574 |
| 5,226,514 | 7/1993 | Chimner et al. | 464/24 |
| 5,245,889 | 9/1993 | Kohno et al. | 74/574 |
| 5,367,921 | 11/1994 | Fukushima | 464/24 |
| 5,370,580 | 12/1994 | Vollet | 464/24 |

FOREIGN PATENT DOCUMENTS

| | | | |
|---|---|---|---|
| 767872 | 4/1954 | Germany . | |
| 3245480 | 4/1985 | Germany . | |
| 461732 | 2/1937 | United Kingdom | 192/106.1 |
| 2145498 | 3/1985 | United Kingdom | 464/51 |

Primary Examiner—Daniel P. Stodola
Assistant Examiner—Eileen A. Dunn
Attorney, Agent, or Firm—Knobbe, Martens, Olson & Bear

[57] ABSTRACT

A flywheel assembly having a clutch disk and at least one flywheel includes the use of at least one undulated ribbon spring formed of an elongated metallic strip, folded in accordion fashion, having an arcuate shape and having a plurality of flat-spring loop sections symmetrically staggered along the arcuate shape. The spring is disposed in a fluid filled chamber within the flywheel assembly. The spring is compressed and expands in response to relative rotary displacement between adjacent parts within the flywheel assembly. The spring absorbs vibration from the adjacent parts within the flywheel assembly. Further, the spring further inhibits the flow of fluid within the fluid filled chamber further absorbing vibrations in response to rotary displacement between adjacent parts within the flywheel assembly. The spring may be disposed in a fluid filled chamber formed within the clutch disk or in other portions of the flywheel assembly.

39 Claims, 11 Drawing Sheets

FOLDED FLAT-SPRING AND DEVICE INTO WHICH THE FOLDED FLAT-SPRING IS INCORPORATED

This application is a continuation of U.S. patent application Ser. No. 08/141,198, filed Oct. 21, 1993, now abandoned.

BACKGROUND OF THE INVENTION

The present invention relates to a folded flat-spring and its incorporation in a damper disc assembly, a damper device and a flywheel assembly.

In damper disc assembly, there are generally an input side member (such as clutch plates or the like), into which torque is input from an engine; and an output side member (spline hubs or the like), for outputting torque to an output side shaft, both are elastically coupled together In the rotational direction through an elastic member. The elastic member is typically made of coil springs which are expanded and compressed for damping torque variation.

In this case, it is necessary to reduce torsion rigidity in order to absorb low load torque variation. In general, in order to reduce the torsion rigidity of the coil springs, it has to decrease the diameter of the wire used in the coils. However, if the diameter of the wire used in the coils was decreased, torque transmission capacity would also be reduced. Accordingly, diameter of the coil springs must be increased in order to maintain a sufficient torque transmission capacity while suppressing the diameter of the wire used in the coils. Axial height of the coil springs would then also increased thereby adversely affecting the compactness of the damper disc assemblies.

A damper device is disposed, for example, between an engine and a transmission of an automotive vehicle for dampening torque variation of the engine. The damper device includes input and output side members which are rotatable relative to each other. coil springs for elastically coupling the input and output side members, and a vibration damper unit for dampening a torsional vibration generated during the power transmission.

Such a conventional damper device is disclosed in, for example, Japanese Patent Application Laid-Open No. 118124/1987. In this device, there are shown a first flywheel and a second flywheel which are rotatable relative to each other, coil springs for elastically coupling both the flywheels, and a viscous resistance generating mechanism interposed between the flywheels. The first flywheel is coupled with a member on the engine side, and the second flywheel is coupled with a clutch device on the transmission side. The damper device is equipped with the coil springs as elastic coupling mechanisms and a viscous resistance generating mechanism for damping the vibration.

In such an arrangement, the coil springs which are embodied in the damper unit require space In the circumferential and axial directions due to their intrinsic structure. Accordingly, it is particularly difficult to incorporate such a large damper device into a front wheel drive type vehicle where the axial space is restricted by many factors. Also, if the rigidity of the coil springs were to be reduced while maintaining a satisfactory torque transmission capacity, the axial height of the device would have to be unduly increased In the same manner as in the coil springs for damper discs described above.

SUMMARY OF THE INVENTION

A primary object of the present Invention is to achieve compactness in the axial direction.

A folded flat-spring according to one aspect of the invention has a plurality of flat-spring loop sections symmetrically staggered across from and opening toward each other, a plurality of flat-spring lever sections that sequentially join opposed alternate ends of the loop sections.

When an external force is applied to the plate-like lever sections of the folded flat-spring, a bending moment is applied to the loop sections contiguous with the lever sections. Thus, elastic energy is dispersed and stored In the respective loop sections. Accordingly, the elastic energy per specific unit volume would be increased. For tills reason, even if a sufficient amount of a torque transmission capacity Is kept with low rigidity, it is possible to reduce the width of the spring.

A damper disc assembly according to another aspect of the present invention comprises an input plate member connected to an engine side member an output member coupled to an output shaft, and a folded flat-spring-for elastically coupling the input and output members in a rotational direction.

In the damper disc, when the input member is rotated, its torque is transmitted to the output member through the folded flat-spring. When a torsional vibration is input into the input member, the relative rotation between the input and output members is continued, and the folded flat-spring is repeatedly compressed and expanded between the input and output members. In this case, the folded flat-spring has a small width in comparison with conventional coil springs. It Is therefore possible to reduce the axial dimension.

A damper device according to still another aspect of the invention comprises an input portion which is rotatable, an output portion which is rotatable relative to the input portion, a viscous fluid receiving portion disposed between the input and output portions for receiving therein viscous fluid, and a folded flat-spring received in the viscous fluid chamber with a predetermined gap for elastically coupling the input and output portions.

When the input portion of the damper device is rotated the power is transmitted to the output portion through the folded flat-spring disposed within the viscous fluid receiving portion. When a torsional vibration is input into the input portion, the relative rotation between the input and output portions is continued, and the folded flat-spring is repeatedly compressed and expanded between the input and output portions. The viscous fluid flows through the gap between the folded flat-spring and the viscous fluid receiving chamber to thereby obtain a predetermined damping force. Thus, the viscous resistance corresponding to a cross section of the gap is generated and energy of the torsional vibration is dampened. It is therefore possible to realize both functions of the conventional elastic coupling mechanism and viscosity resistance generating mechanism with the viscous fluid receiving chamber and the folded flat-spring received in the viscous fluid receiving chamber, whereby the axial dimension of the damper device is reduced.

The foregoing and other objects, aspects and advantages of the present invention will become more apparent from the following detailed description, when taken in conjunction with the accompanying drawings.

DESCRIPTION OF THE PREFERRED EMBODIMENTS

First Embodiment

Figure 1:
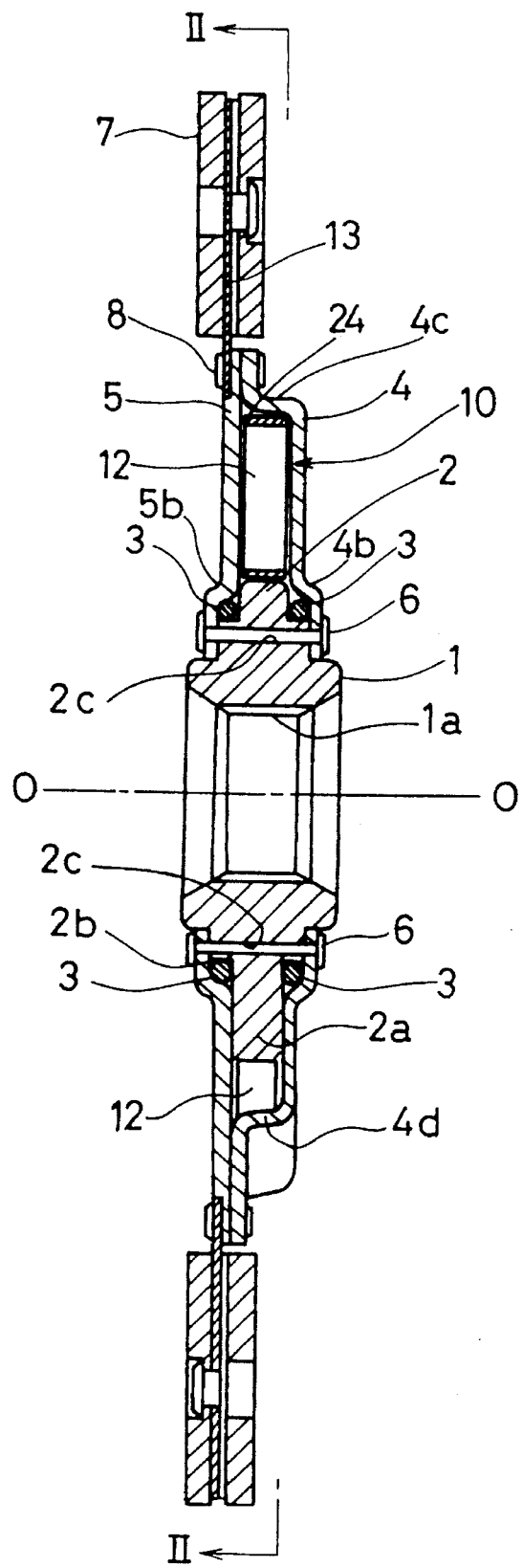
FIG. 1 is a longitudinal sectional view showing a damper disc assembly in accordance with a first embodiment of the invention.
Figure 2:
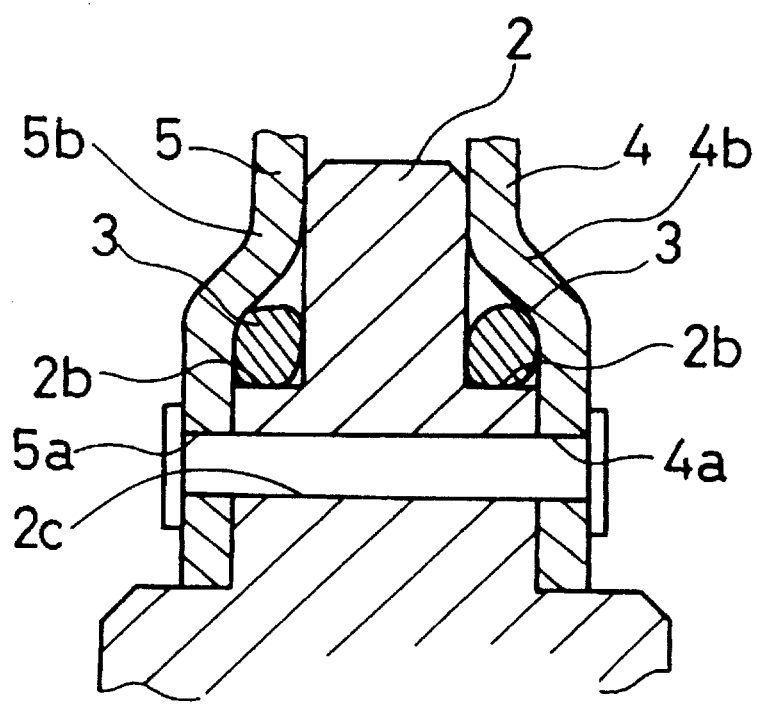
FIG. 2 is an enlarged view showing a part shown in FIG. 1.
Figure 3:
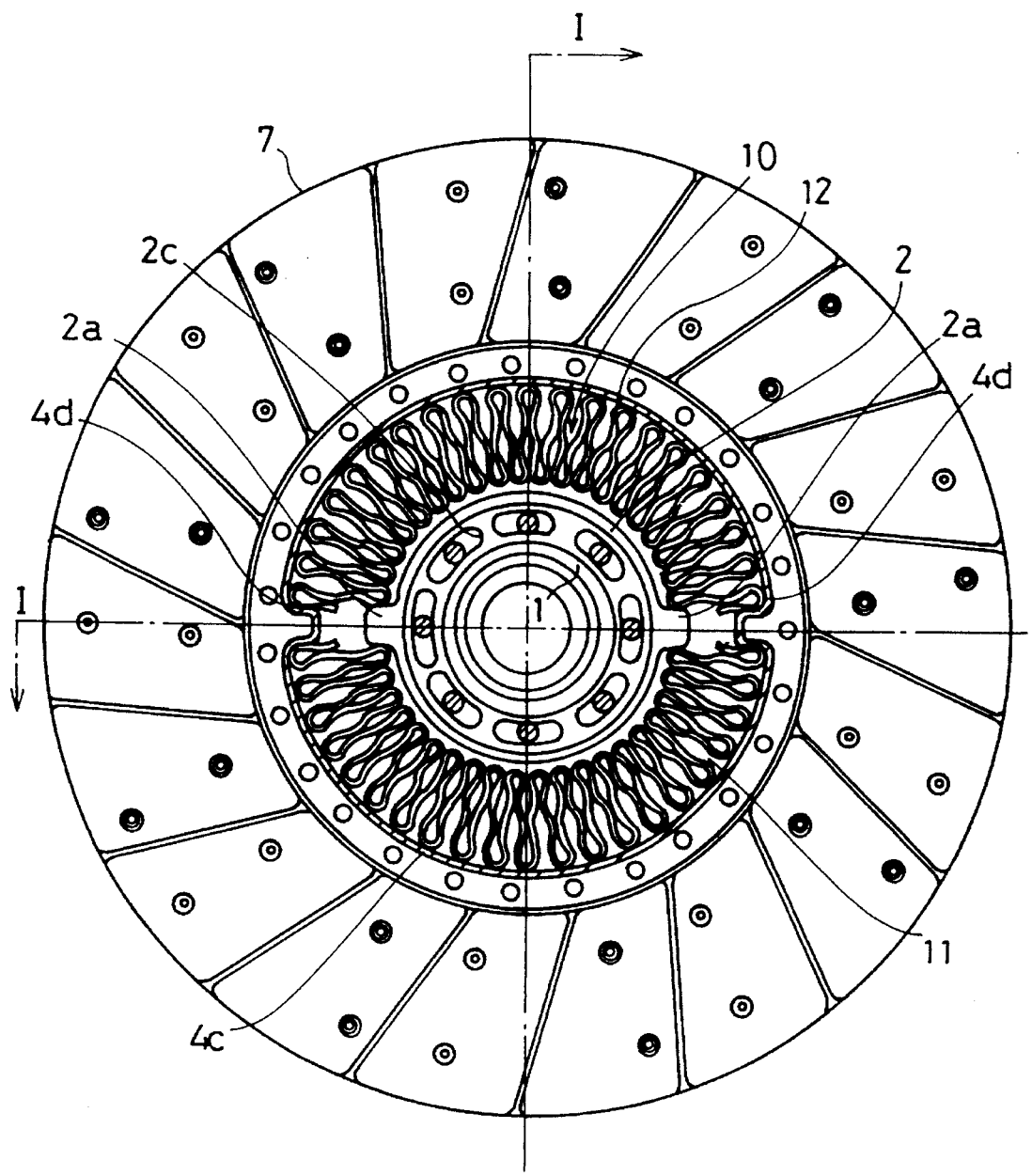
FIG. 3 is a view as viewed in a direction II of FIG. 1.

FIGS. 1 to 3 show a damper disc assembly in accordance with a first embodiment of the invention. In FIG. 1, line O—O represents the axial centerline.

A spline hub 1 which may be coupled with an output shaft (not shown) is disposed at the center of the damper disc assembly. The spline hub 1 has at Its center spline holes 1a which engage with peripheral splines of an output shaft (not shown). A radially outward projecting flange portion 2 is formed integrally with the spline hub 1. As shown in FIG. 3, two protrusions 2a each extend radially outwardly from diametrically opposing portions of the flange portion 2. Circumferential step portions 2b are formed on both sides of the flange portion 2, and O-rings 3 are arranged respectively one on either lateral side of flange portion 2 and in the step portions 2b to form a seal mechanism. A plurality of oblong holes 2c, along in the circumferential direction, penetrate the flange 2 and are formed in an inner peripheral side of the step portions 2b at a fixed interval.

A generally disc-shaped retaining plate 4 and a clutch plate 5 are fitted onto the spline hub 1. A plurality of stop pin holes 4a and 5a are formed at a fixed interval in radially inner edges of the retaining plate 4 and the clutch plate 5, respectively. These are in turn mounted on the flange portion 2 by stop pins 6 fixed to the respective holes 4a and 5a and inserted the oblong holes 2c. It should be noted that the plates 4 and 5 are rotatable relative to the flange 2 in a range defined by a circumferential length of the oblong holes 2c.

Annular bent portions 4b and 5b are formed in the inner circumferential portions of the respective plates 4 and 5 for abutting with the O-rings 3 on respective sides of the flange portion 2. A bent portion 4c bent toward the clutch plate 5 side is formed in the outer circumferential portion of the retaining plate 4. The bent portion 4c is fixed together with cushioning plates 13 to the radially outer portion of the clutch plate 5 by rivets 8. Retainer portions 4d recessed radially inwardly are formed to correspond with the protrusions 2a of the flange 2 at two diametrically opposite positions in the bent portion 4c. Friction facings 7 are attached to opposite surfaces of the cushioning plates 13.

Arranged in this way, the retaining plate 4 and the clutch plate 5 disposed on the opposite sides of the spline hub 1 are embodied to define an annular liquid chamber 10 together with the flange 2; and the liquid chamber 10 is sealed by the O-rings 3.

A pair of folded flat-springs 12 are disposed within the liquid chamber 10 along with damper oil 11 having a predetermined viscosity. Each folded flat-spring 12 forms a semicircle and is flexible through a wide angle.

Figure 4:
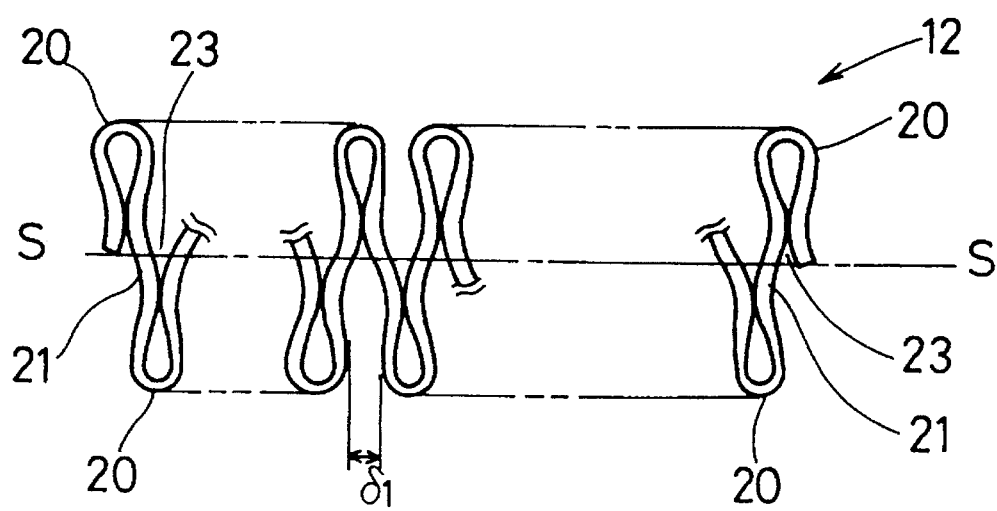
FIG. 4 is a front partial view showing a folded flat-spring.

As shown in FIG. 4, each folded flat-spring 12 is comprised of a plurality of loop sections 20 and lever sections 21 connected in series. The plurality of loop sections 20 are arranged in a staggered manner. Each loop section has loop ends 23 from which the lever sections 21 extend from ends of loop portion 20 on the opposite side. Connected loop ends 23 are not in alignment with each other in a direction that the folded flat-spring 12 extends. Namely, each lever section 21 is obliquely arranged and the respective lever sections 21 spread out from the loop ends 23 as seen from the loop sections 20.

Each loop section 20 is rounded and has approximately the same diameter. Also, a gap δ 1 of predetermined length separates adjacent loop section 20. Thickness of the folded flat-spring 12 is uniform. Width of the folded flat-spring 12 is uniform too so that a shape of the spring seen from the direction in which the spring extends is a rectangular.

When the folded flat-spring 12 is disposed in an arc shape within the liquid chamber 10, the loop ends 23 are closed and touching. Moreover, outer edges of the radially inward loop sections 20 are pushed together, forcing the lever sections 21 to force the edges of the radially outward loop sections away from each other. Much like an opened collapsable hand fan, the radially inner part is bunched together while the radially outer part fans outward.

The folded flat-spring 12 is disposed within the liquid chamber 10 such that the far left and right loop sections 20 of the flat-spring 12 are in contact with the protrusions 2a and the retaining portions 4b. In the liquid chamber 10, the folded flat-spring 12 forms predetermined gaps in the space between itself, and walls made of the retaining plate 4, the clutch plate 5 and the flange 2.

Operation of the apparatus explained above is detailed below:

Torque transmitted through the friction facings 7 to the clutch plate 5 and the retaining plate 4 is then transmitted from the retaining portion 4d of the retaining plate 4 to the folded flat-springs 12, and then further transmitted to the spline hub 1 through the flange portion 2 to the output shaft (not shown).

When the torsional vibration is input into the damper disc assembly, the input side members, plates 4 and 5, and the output side member the spline hub 1 are rotated relative to each other. As a result, the folded flat-springs 12 are repetitively expanded and compressed between the input and output side members. During this time, the damper oil 11 in the folded flat-spring in the liquid chamber 10 passes through the gaps between the folded flat-spring, and the walls of the retaining plate 4, the clutch plate 5 and the flange 2. Thus, the flow of the damper oil 11 is throttled to generate viscous resistance corresponding to cross sections of the gaps.

The compression of the folded flat-springs 12 will be explained. When the folded flat-springs 12 are compressed, each opening angle of the lever sections 21 becomes small so that the bending moment is applied to each loop section 20. The lever sections 21 flex wherein loop ends 23 function as a fulcrum. Elastic energy is then dispersed and stored in the plurality of loop sections 20. In addition, elastic energy stored in a specific volume of the folded flat-springs 12 is larger than that of the conventional coil springs.

The damper oil 11 within the liquid chamber 10 lubricates the folded flat-springs 12, the plates 4 and 5, and the flange 2, so that the extension and contraction motion of the folded flat-springs 12 is smoothly attained and a frictional wear of each component may be prevented.

As described above in the foregoing embodiment, by using the folded flat-springs 12, it is possible maintaining the low rigidity similar to that of conventional toll springs to decrease the width of the spring. Consequently, it is possible to decrease the axial dimension of the damper disc assembly.

Figure 5:
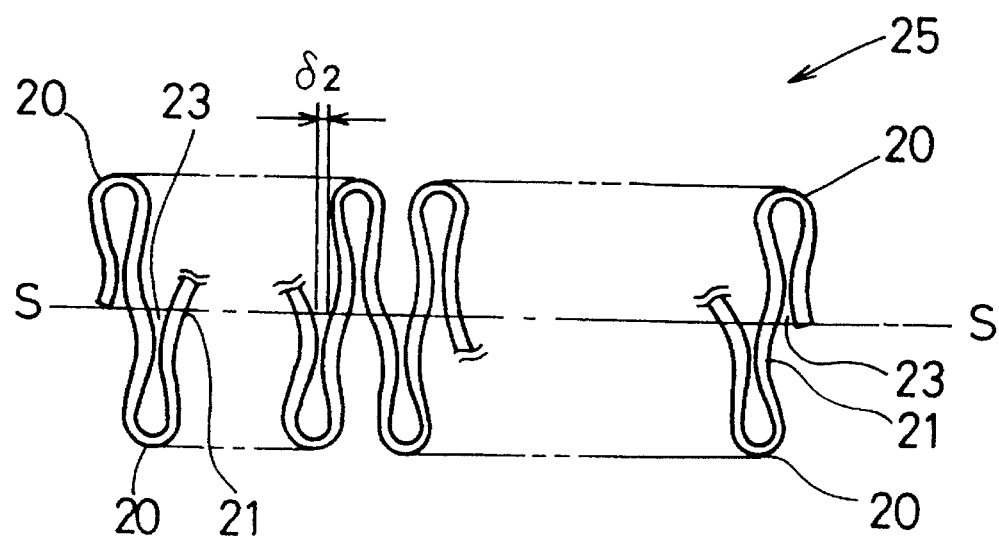
FIG. 5 is a view showing a modification corresponding to FIG. 4.

The folded flat-springs are also effective for absorbing the torsional vibration because of their low rigidity and their wide torsional angle, which may even be increased further.
Modifications (a) in the foregoing embodiment, the open loop ends 23 of the folded flat-springs 12 are closed and touching under the set condition. However, as shown in FIG. 5, a gap δ2 may be formed between the loop ends 23 under the set condition. In this case, when the folded flat-spring 25 is compressed, the opening angle of the respective lever sections 21 becomes smaller, so that bending moment is applied to the loop sections 20. At this time, torsion characteristics of low rigidity are exhibited by the loop sections 20 until the gap δ2 of the loop ends 23 reaches zero. When the compression is further continued, the lever sections 21 flex about the loop ends 23 as a fulcrum so that torsion characteristics of relatively high rigidity are exhibited. Thus, it is possible to obtain the two-stage torsion characteristics.

(b) In the foregoing embodiments, both ends of the folded flat-spring 12 are brought into contact with the retainer portions 4d of the retaining plate 4 by the loop sections 20. However, as shown in FIGS. 6 and 7, an abutment portion 22 may be provided at a tip end of each lever section 21 at free ends.

Figure 6:
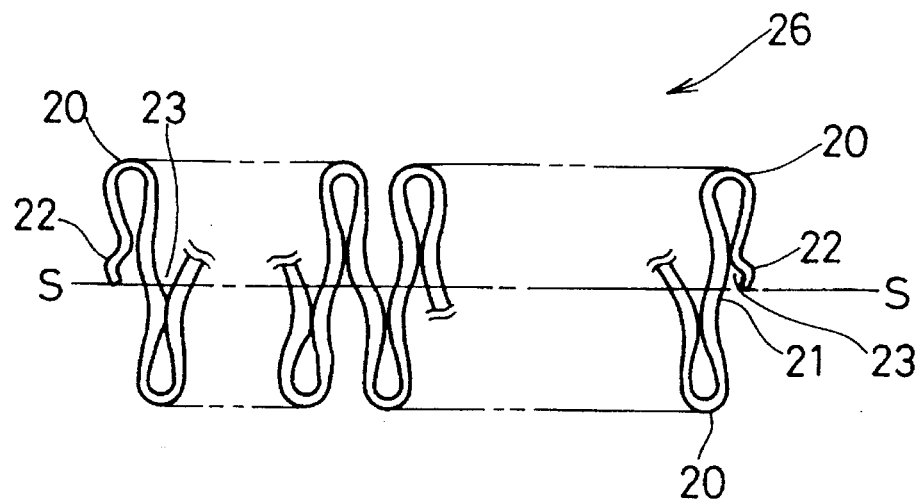
FIG. 6 is a view showing a modification corresponding to FIG. 4.
Figure 7:
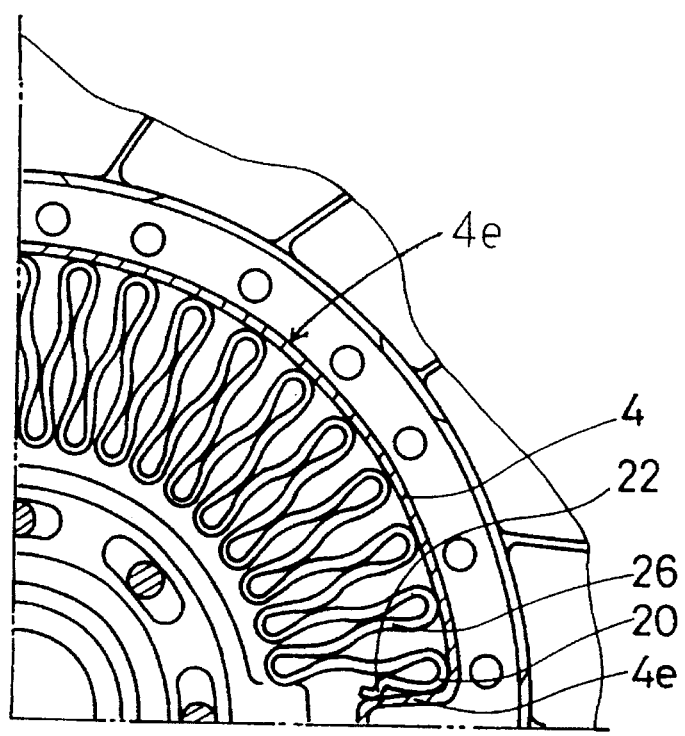
FIG. 7 is a partially enlarged view showing a modification shown in FIG. 6 corresponding to FIG. 3.

Each abutment portion 22 is formed by bending the tip end portion of each lever section 21 in an angular shape and is offset to be located from a center line S—S of the radial direction of the folded flat-spring 26 toward the radially outward portion (upwardly in FIG. 6).

On the other hand, the retainer portion 4e of the retaining plate 4 is formed with its tip end reaching a center in the radial direction of the folded flat-spring 26. For this reason, the abutment portion 22 is brought into contact with the retainer portion 4e. Accordingly, also in the case where the folded flat-spring 26 is disposed in an arc shape within the liquid chamber 10 and then compressed, the loop sections 20 on the radially outer side of the folded flat-spring 26 would not be pressed by the bent portion 4c of the retaining plate 4.

Figure 8:
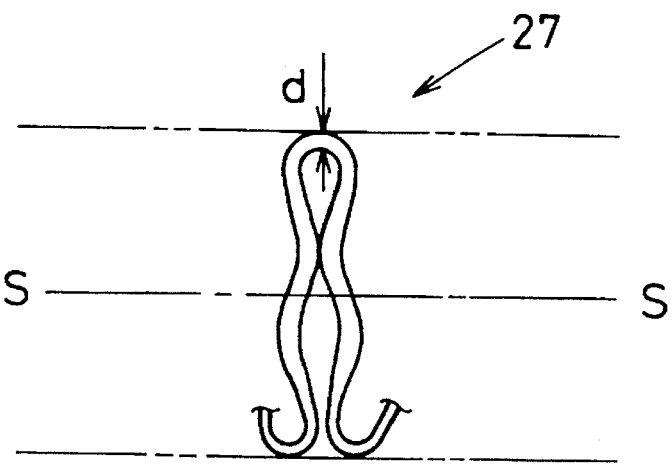
FIG. 8 is a view showing a further modification corresponding to FIG. 4.

(c) in the foregoing embodiments, the thickness of the folded flat-spring 12 is kept constant. However, as shown in FIG. 8, it is possible to change the thickness d relative to the longitudinal direction as desired. In FIG. 8, the loop section on the radially outer side is thicker than the loop section on the radially inner side. Thus, the bending stress applied to the folded flat-spring 27 is kept constant, so that a large flex displacement may be obtained.

Figure 9:
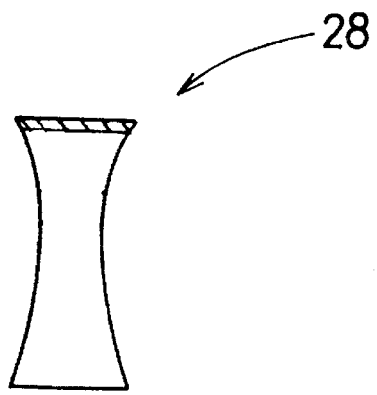
FIG. 9 is a view showing still another modification.

(d) in the foregoing embodiments, a shape of the folded flat-spring 12 seen from the direction in which the folded flat-spring 12 extends is rectangular. However, as shown in FIG. 9, it may be formed in a pincushion-shape. In this case, the width dimension in a mid portion of the folded flat-spring 28 where the bending stress to be applied is kept at minimum is kept smallest. Namely, the width of the lever sections is smallest and gradually increased toward the loop sections on both sides. Also, the width of the loop section is gradually increased from the loop ends toward the outside. Thus, the bending stress generated in the expansion and contraction conditions is kept uniform in the radial direction and the weight may be reduced.

Figure 10:
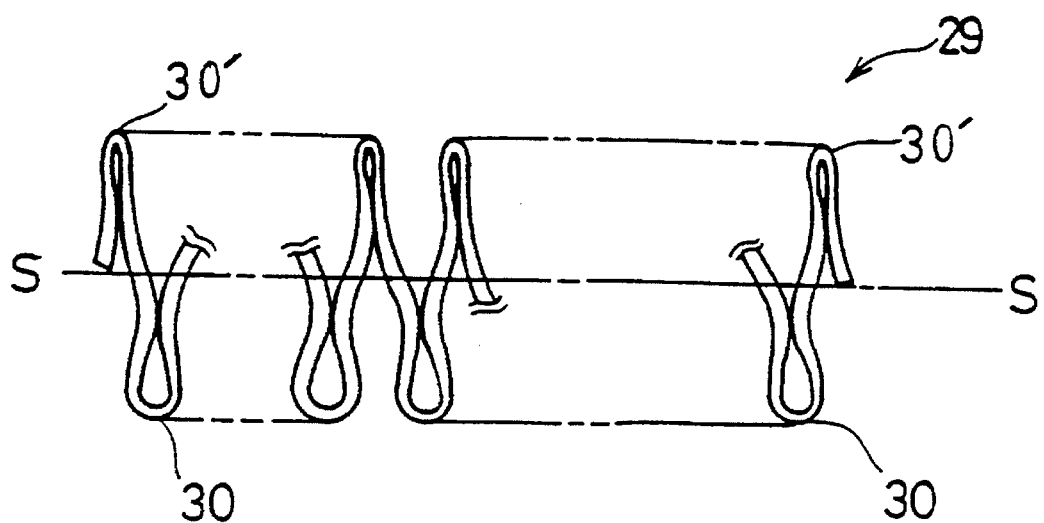
FIG. 10 is a view showing a further modification corresponding to FIG. 4.
Figure 11:
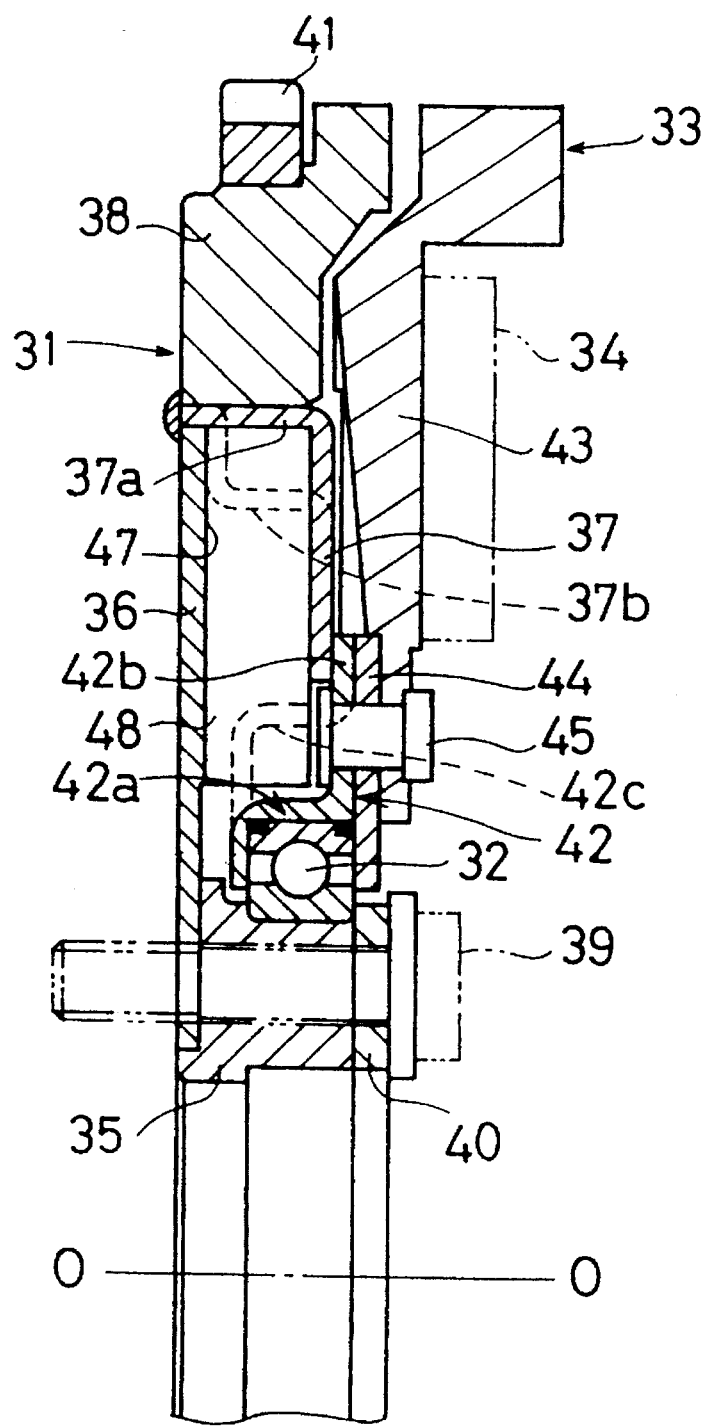
FIG. 11 is a longitudinal partial sectional view showing a flywheel assembly according to a second embodiment of the invention.
Figure 12:
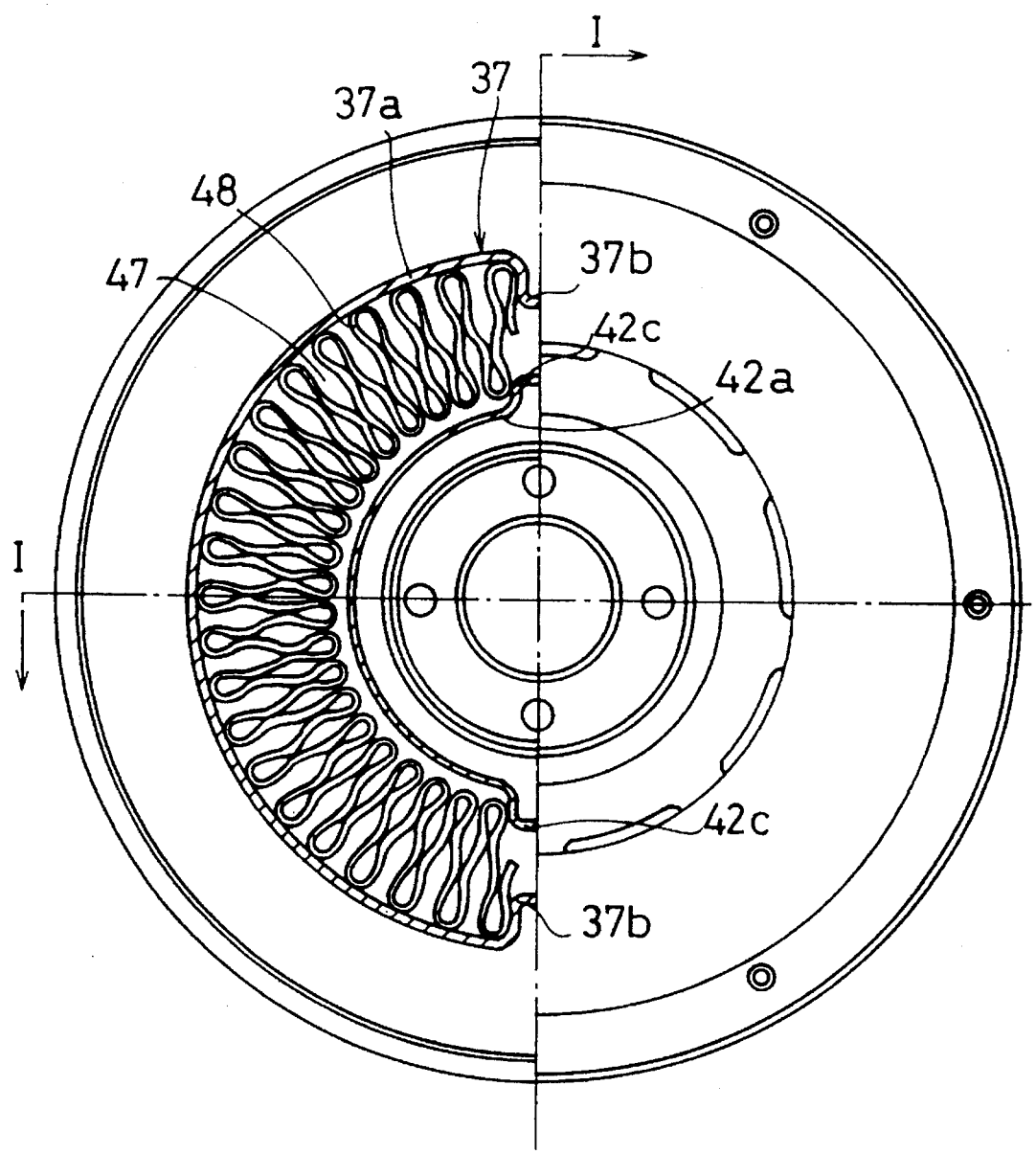
FIG. 12 is a frontal partial sectional view showing the flywheel assembly shown in FIG. 11.

(e) in the foregoing embodiments, the plurality of loop sections 20 of the folded flat-springs 12 have substantially the same shape. However, loop sections which are different in shape may be used like 30 and 30, as shown in FIG. 10. In this case, the dispersing amount of classic energy may be adjusted between the radially outer side and the radially inner side of the folded flat-spring 29. In FIG. 10, the loop sections 30 on the radially outer side are smaller in diameter than the loop sections 30 on the radially inner side.
Second Embodiment FIGS. 11 and 12 show a flywheel assembly into which a damper device in accordance with an embodiment is incorporated. In Figures, line O—O represents the centerline of the flywheel assembly.

The flywheel assembly includes a first flywheel 31 fixed to a crankshaft (not shown), and a second flywheel 33 rotatably supported on the first flywheel 31 through a bearing 32. Friction facings 34 of a clutch disc assembly (not shown) is pressingly applied to the second flywheel 33.

The first flywheel 31 is composed of a hub 35 disposed centrally, a disc-like input plate 36 disposed on the engine side of the hub 35, a disc-like opposite plate 37 disposed opposite the input plate 36 in the axial direction, and an annular first flywheel body 38 fixed to an outer circumferential portion of the input plate 36. The hub 35 and the input plate 36 are fixed to the crankshaft by bolts 39 and a washer plate 40. An outer circumferential portion 37a of the opposite plate 37 is bent toward the input plate 36 and is inserted into an inner circumferential portion of the first flywheel body 38. An edge of the bent portion 37a is welded to the outer circumferential portion of the input plate 36 and the inner circumferential portion of the first flywheel body 38. Also, a ring gear 41 is fixed to an outer circumferential portion of the first flywheel body 38.

Figure 13:
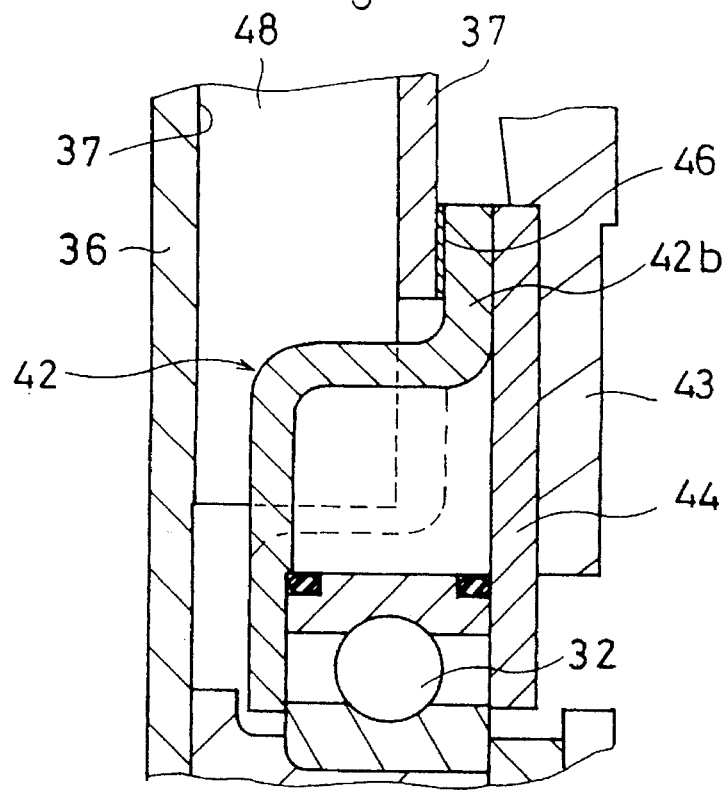
FIG. 13 is an enlarged view showing a part shown in FIG. 11.

As shown in FIG. 13, the second flywheel 33 is composed of an output plate 42, an annular second flywheel 43, and an intermediate plate 44 interposed between the output plate 42 and the second flywheel body 43. These components are coupled to each other by a plurality of rivets 45. The output plate 42 is composed of an inner circumferential support portion 42a supported by the bearing 32 and a mounting portion 42b extending radially outwardly from the support portion 42a. The support portion 42a is kept in contact with one side surface and an outer circumferential surface of the bearing 32. A seal member 46 is interposed between an outer circumferential portion of the mounting portion 42b and an inner circumferential portion of the opposite plate 37 for sealing both the components. An inner circumferential portion of the intermediate plate 44 is in contact with the other side surface of the bearing 32.

With such an arrangement, a fluid chamber 47 is defined by the input plate 36, the opposite plate 37 and the output plate 42. A viscous fluid such as grease is filled in the interior of the fluid chamber 47, and a pair of folded flat-springs 48 are disposed in the fluid chamber 47. The pair of folded flat-springs 48 are disposed substantially in the form of a semicircle so that the springs may flex through a wide angle.

Figure 14:
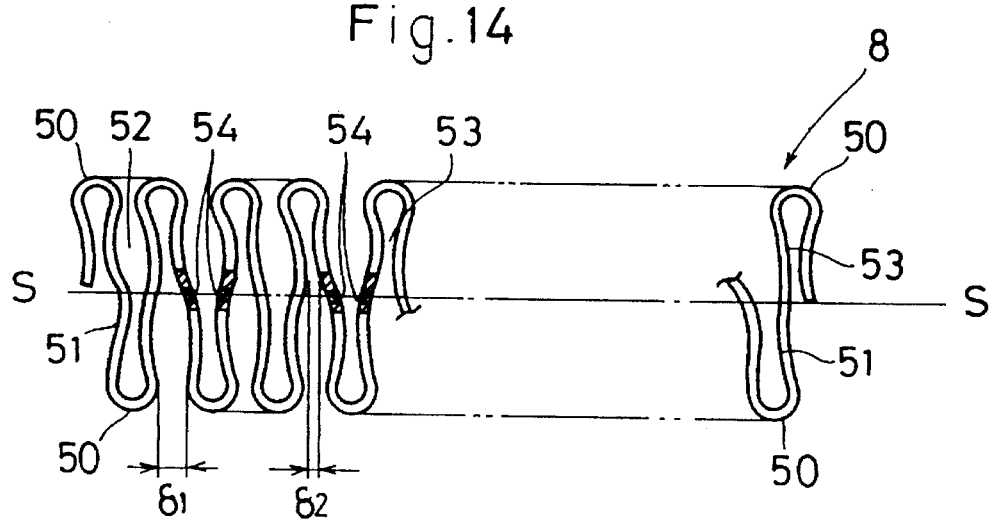
FIG. 14 is a front view showing a folded flat-spring.

As shown in FIG. 14, the folded flat-spring 48 is composed of a plurality of loop sections 50 and lever sections 51 coupled with the loop sections 50 in series. The respective loop sections 50 are arranged in a staggered manner in one direction. Loop ends 53 of loop sections 50 are opened toward the opposite row. The lever sections 51 sequentially couple alternate ends of the loop ends 53 of the opposite loop sections 50.

Each loop section 50 is an annular component having substantially the same diameter and a gap δ1 having a predetermined length between the adjacent loop sections 50. Under the set condition that the folded flat-spring 48 is arranged in an arc shape, each loop ends 53 has a gap δ2 under the free condition and the set condition. Connected loop ends 53 are not in alignment with each other in a direction that the folded flat-spring 48 extends. Namely, each lever section 51 is obliquely arranged and the respective lever sections 51 spread out from the loop ends 53 as seen from the loop sections 50.

Figure 15:
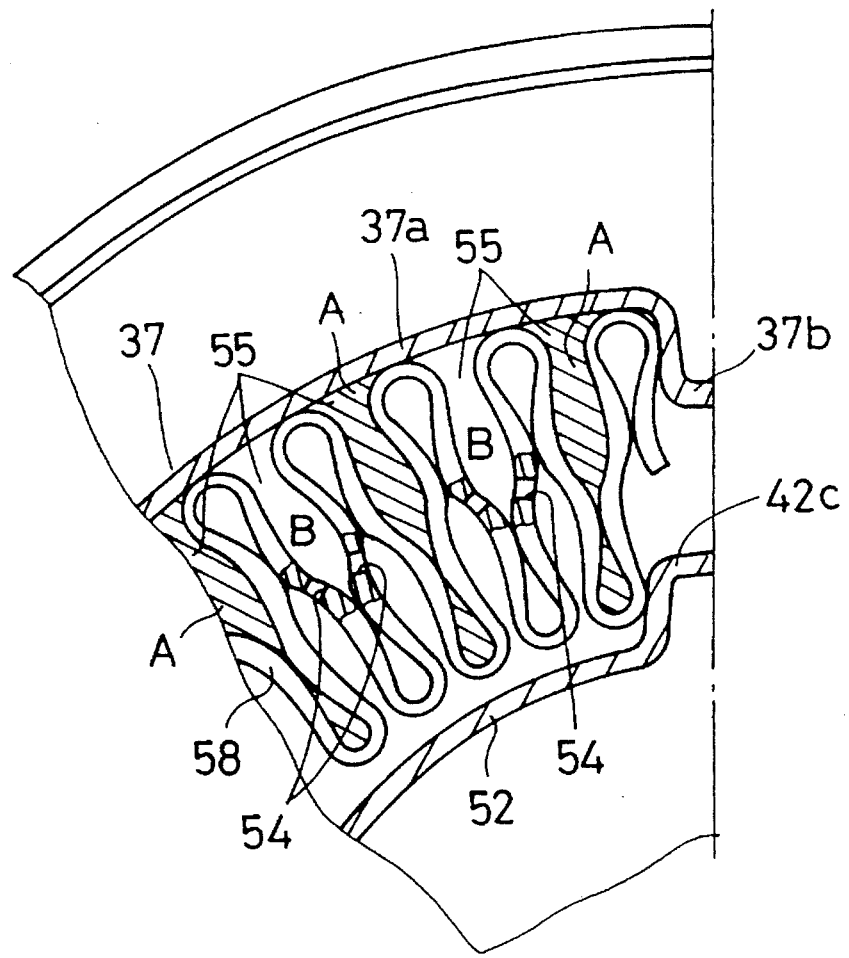
FIG. 15 is a partially enlarged view showing a part shown in FIG. 12.

Also, a width of the folded flat-spring 48 is substantially the same as that of the fluid chamber 47 but a radial length of the flat-spring 48 is shorter than that of the fluid chamber 47. In the case where the thus constructed folded flat-spring 48 is loaded in the fluid chamber 47, as shown in FIG. 15, a plurality of closed spaces 55 are formed between walls of the fluid chamber 47 and the folded flat-spring 48. A hole 54 is formed in a part of each lever section 51 of the folded flat-spring 48 for discharging the viscous fluid stagnant within a part of the closed spaces 55. In this embodiment, the holes 54 are formed so that the fluid in every two of the plurality of closed spaces 55 may discharge. Thus, first closed spaces A having no holes 54 and second closed spaces B having the holes 54 are alternatively arranged.

Also, as shown in FIGS. 11 and 12, two retainer portions 37b each of which extends radially inwardly are formed at diametrically opposite positions of the outer circumferential portion of the opposite plate 37. The retainer portions 37b are used to support the loop sections 50 of the folded leaf spring 48 on the radially outer side. Further, two retainer portions 42c each of which extends radially outwardly are formed at diametrically opposite positions in the outer circumferential portion of the support portion 42a of the output plate 42. The retainer portions 42c are brought into contact with the loop sections 50 on the radially inner side of the folded flat-spring 48. With such an arrangement, the power which has been input into the first flywheel 31 is transmitted to the second flywheel 33 through the folded flat-spring 48.

The operation will be described.

The torque which has been transmitted from the crankshaft of the engine to the first flywheel 31 is transmitted to the folded flat-spring 48 through the input plate 36 and the retainer portions 37b of the opposite plate 37. Further, the torque is transmitted from the folded flat-spring 48 to the second flywheel 133 through the retainer portions 42c of the output plate 42.

When torsional vibration is input into the flywheel assembly, the first flywheel 31 and the second flywheel 33 are continuously rotated relative to each other through the folded flat-springs 48. At this time, the folded flat-springs 48 are repeatedly expanded and compressed, so that the viscous fluid will flow through the gaps between the folded flat-spring 48 and the walls of the fluid chamber 47. The energy of the torsional vibration is damped by the viscous resistance generated at the gaps.

The operation of the compression of the folded flat-spring 48 will be explained.

When the folded flat-spring 48 is compressed, the opening angle of the respective lever sections 51 is decreased so that bending moment is applied to the loop sections 50. At this time, the lever sections 51 flex wherein the loop ends 53 functions as a fulcrum. The bending moment will be dispersed uniformly in the longitudinal direction in the lever sections 51 and at the same time, the elastic energy is dispersed and stored in the plurality of loop sections 50.

In this case, the torsional characteristics depend upon the torsional rigidity of the folded flat-spring 48. Namely, in a small torsional angle range wherein the gaps δ2 is kept in the loop ends 53, the loop sections 50 and the lever sections 51 will flex in the same direction wherein the outer circumferential portions of the loop sections 50 functions as fulcrums, thereby to decrease the rigidity. On the other hand, as the torsional angle is increased, the gaps δ2 become zero so that the elastic energy is stored in the loop sections 50 wherein the loop ends 53 functions as fulcrums, thereby to increase the rigidity.

With such an arrangement in the folded flat-spring, for instance, if it is 13 mm wide and 44 mm long, the stopper torque of 50 kgm may be obtained. In contrast, with the conventional coil spring having a coil diameter of 28 mm, the stopper torque of 36 kgm would be an upper limit.

The operation for generating the viscous resistance by the viscous fluid will be described.

As shown in FIG. 15, in the first closed spaces A indicated by the hatched lines in the plurality of closed spaces 55 has no holes in the lever sections 51 which define the closed spaces 55. For this reason, when the folded flat-spring 48 is compressed or expanded, the viscous fluid flows through the small gaps between the flat-spring 48 and the fluid chamber 47 to generate a large viscous resistance. On the other hand, in the second open spaces B in the plurality of closed spaces 55, there are formed holes 54 in the lever sections 51. Accordingly, the viscous fluid will flow through the holes 54 to generate a small viscous resistance.

Figure 16:
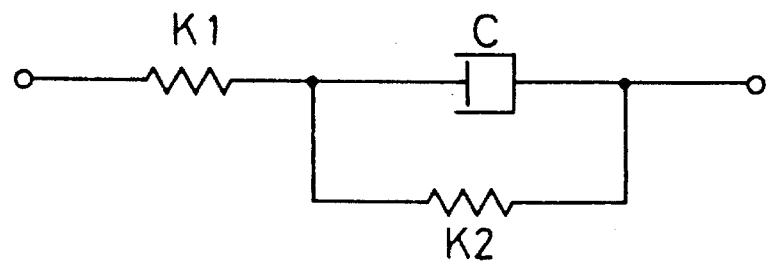
FIG. 16 is a schematic view showing a power transmission system of the flywheel assembly shown in FIG. 12.

A power transmission system composed of the fluid received in the fluid chamber 47 and the folded flat-spring 48 is schematically shown in FIG. 16, in which K1 represent a spring component formed by the second closed spaces B shown in FIG. 15, K2 represents a spring component formed by the first closed spaces A, and C represents the viscosity generation part formed by the part of the first closed spaces A. In FIG. 16, the viscosity Fc and the spring force Fk are given as follows:

$$Fc = C \cdot d\theta/dt$$

where $d\theta/dt$ is the rotational velocity, and $$Fk = K \cdot \theta$$

where $\theta$ is the rotational displacement.

With such an arrangement, since non-compressive viscous fluid is received in the first closed spaces A, and the gaps are small, the spring force of the first closed spaces A is small and the viscous resistance is large. Namely, a relationship, $Fc \gg Fk2$, is established. For this reason, the spring component K2 in FIG. 16 is negligible so that the spring force by the spring component K1 and the viscous dampening force functions in series. As a result, it is possible to cancel a resonance in the system provided with two flywheels 31 and 33.

Incidentally, in the case where no holes 54 were formed in a part of the folded flat-spring 48, since the viscous fluid is non-compressive fluid. The folded flat-spring 48 would be deformed toward the inner circumferential portion so as to separate away from the outer circumferential portion 37a of the opposite plate 37. In this case, the gaps through which the viscous fluid flows would be enlarged, and it is impossible to obtain a desired viscous resistance. It is therefore impossible to realize the power transmission system in which the spring force and the viscous dampening force functions in series as described above.

In the embodiment shown, by using the folded flat-springs 48, it is possible to decrease an axial dimension of the flywheel assembly in comparison with the conventional system using the coil springs. Also, the conventional torsion springs and frictional resistance generating mechanism may be formed of the fluid chamber 47 and the folded flat-springs 48, thereby simplifying the structure at low cost.

Modifications

In the foregoing embodiment, the gaps δ are formed between the loop ends 53. It is possible to the gaps δ of zero between the loop ends in the set condition as shown in FIG. 4 showing the first embodiment.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A damper device comprising:

a rotatable input portion;

an output portion rotatable relative to said input portion;

a viscous fluid receiving portion disposed between said input portion and said output portion for receiving therein viscous fluid; and an undulated ribbon-like spring folded accordion style received within said viscous fluid receiving portion for coupling said input portion and said output portion in the circumferential direction.

2. The damper device according to claim 1, wherein a plurality of closed spaces are formed between walls of said viscous fluid receiving portion and said undulated ribbon-like spring; and said undulated ribbon-like spring has holes for causing the viscous fluid to flow out from said plurality of closed spaces.

3. The damper device according to claim 2, wherein said holes are formed such that the viscous fluid alternately flows out from every two of said plurality of closed spaces, whereby said closed spaces alternatively form first closed spaces having said holes and second closed spaces for serving as parts for generating viscous resistance.

4. The damper device according to claim 1, wherein said undulated ribbon-like spring comprises:

a plurality of flat-spring loop sections symmetrically staggered across from and opening towards each other;

a plurality of flat-spring lever sections, sequentially joining opposed alternate ends of the loop sections.

5. The damper device according to claim 4, wherein gaps separate loop sections disposed adjacent to each other.

6. The damper device according to claim 5, wherein said loop sections and said lever sections are disposed in an arc shape.

7. The damper device according to claim 6, wherein said undulated ribbon-like spring together with walls of said viscous fluid receiving portion form a plurality of closed spaces; and some of said lever sections have holes for discharging viscous fluid from parts of the plurality of closed spaces.

8. The damper device according to claim 7, wherein said holes are formed such that the viscous fluid flows out from every two of said plurality of closed spaces, whereby said closed spaces alternatively form closed spaces having said holes.

9. A damper disc assembly for a clutch and flywheel assembly comprising:

a plate member selectively coupleable to a crank shaft of an engine;

a spline hub disposed in an axial alignment with said plate member coupleable with an output shaft; and at least one undulated ribbon-like spring formed from an elongated flat metal strip repeatedly folded accordion-style disposed between said plate member and said spline hub, connecting said plate member and said spline hub with each allowing limited rotary displacement therebetween.

10. The damper disc assembly as in claim 9, wherein a portion of said plate member at least partially defines an arcuate fluid filled chamber between said plate member and said spline hub and said undulated ribbon-like spring is formed in an arc shape and is disposed within said arcuate fluid filled chamber.

11. The damper disc assembly according to claim 10, wherein a pair of said undulated ribbon-like spring are disposed within said fluid filled chamber and said plate member is provided with radially inwardly projecting protrusions which contact portions of said pair of said undulated ribbon-like spring in the circumferential direction, and said spline hub has radially extending protrusions which contact portions of said pair of said undulated ribbon-like spring in the circumferential direction.

12. The damper disc assembly according to claim 11, wherein each of said undulated ribbon-like springs comprises a plurality of flat-spring loop sections symmetrically staggered across from and opening toward each other; and a plurality of flat-spring lever sections, sequentially joining opposed alternate ends of said loop sections.

13. The damper disc assembly according to claim 12, wherein said pair of undulated ribbon-like springs are disposed in semicircular shapes;

said lever sections extending from the loop sections at free ends of the undulated ribbon-like spring are bent into elbow shaped contact sections, said contact sections extend radially outward away from a radial center of said flat-spring lever section;

said inwardly projecting protrusions are composed of a pair of support portions which extend radially inward from diametrically opposite positions of said plate member, said pair of support portions supporting each of said undulated ribbon like springs at radially outer free ends; and said radially extending protrusions are composed of a pair of protrusions portions which extend radially outwardly from diametrically opposite positions of said spline hub, said pair of protrusion portions being in contact with each of said undulated ribbon like springs at radially inner free ends.

14. The damper disc assembly according to claim 12, wherein said loop sections are arranged obliquely so as to spread out from said opposite alternate ends of said loop sections.

15. The damper disc assembly according to claim 14, wherein gaps separate loop sections disposed adjacent to each other.

16. The damper disc assembly according to claim 15, wherein said alternate ends of each of said loop sections touch.

17. The damper disc assembly according to claim 15, wherein gaps separate said alternate ends of said loop sections.

18. The damper disc assembly according to claim 15, wherein thickness of said flat-spring loop sections on the radially outer side is larger than that of said flat-spring loop sections on the radially inner side.

19. The damper disc assembly according to claim 15, wherein a width of said flat-spring lever sections is smaller than that of said flat-spring loop sections.

20. The damper disc assembly according to claim 19, wherein a width of each of said flat-spring lever sections gradually increases in both the radial directions from the center, a width of said flat-spring loop sections increases from said alternate ends to its middle point.

21. The damper disc assembly according to claim 15, wherein a diameter of said flat-spring loop sections on the radially outer side is larger than that of said flat-spring loop sections of the radially inner side.

22. The damper disc assembly according to claim 9, wherein said plate member is disposed on both sides of said spline hub and is composed of a pair of side plates for defining, together with said spline hub, an annular fluid chamber which is filled with viscous fluid;

a pair of said undulated ribbon-like springs are received in said fluid chamber such that a predetermined space is formed between said undulated ribbon-like springs, and walls made of said side plates and said spline hub.

23. The damper disc assembly according to claim 22, wherein said undulated ribbon-like springs are disposed within said fluid chamber in an arc shape.

24. The damper disc assembly according to claim 23, wherein said undulated ribbon-like springs are arc shape;

said plate member has supports for supporting undulated ribbon-like springs in the circumferential direction; and said spline hub has protrusions which contact with said undulated ribbon-like springs in the circumferential direction.

25. The damper disc assembly according to claim 24, wherein each of said undulated ribbon-like springs comprises a plurality of flat-spring loop sections symmetrically staggered across from and opening toward each other; and a plurality of flat-spring lever sections, sequentially joining opposed alternate ends of the loop sections.

26. The damper disc assembly according to claim 25, wherein said opposed alternate ends of said loop sections are offset from one another.

27. The damper disc assembly according to claim 26, wherein gaps separate loop sections disposed adjacent to each other.

28. A flywheel assembly comprising:

a flywheel assembly having a hub portion, an input portion and a first flywheel, wherein said input portion at least partially defines a fluid chamber at least partially filled with viscous fluid;

a second flywheel supported on said hub portion for limited relative rotation therewith;

a damper device interposed between said first and second flywheels within said fluid chamber, said damper device including an undulated ribbon-like spring formed from an elongated flat metal strip repeatedly folded accordion style for coupling said first and second flywheels in the circumferential direction.

29. The flywheel assembly as in claim 28 wherein said input portion further comprising a pair of disc-like plates, one of said disc-like plates fixed to said hub portion and said first flywheel, said pair of disc-like plates at least partially defining said fluid chamber.

30. The flywheel assembly according to claim 28, wherein said undulated ribbon-like spring is formed in an arc shape within said fluid chamber.

31. The flywheel assembly according to claim 28, wherein said first flywheel has a pair of disc-like plates, one of said disc-like plates having support portions for supporting a portion of said undulated ribbon-like spring in the circumferential direction; and an annular portion of said second flywheel includes projections which contact an end portion of said undulated ribbon-like spring in the circumferential direction.

32. The flywheel assembly according to claim 31, wherein said undulated ribbon-like spring comprises a plurality of flat-spring loop sections symmetrically staggered across from and opening toward each other; and a plurality of flat-spring lever sections, sequentially joining opposed alternate ends of the loop sections.

33. The flywheel assembly according to claim 32, wherein said undulated ribbon-like spring is disposed in a semicircular shape;

said support portion extends radially inward from one of said disc-like plates; and said projections of said second flywheel extend radially outwardly.

34. The flywheel assembly according to claim 33, wherein said opposed alternated ends of said loop sections are offset from one another.

35. The flywheel assembly according to claim 34, wherein gaps separate loop sections disposed adjacent to each other.

36. The flywheel assembly according to claim 35, wherein said undulated ribbon-like spring together with walls of said fluid chamber form a plurality of closed spaces; and some of said lever sections have holes for discharging viscous fluid from parts of the plurality of closed spaces.

37. The flywheel assembly according to claim 36, wherein said holes are formed such that the viscous fluid flows out from every two of said plurality of closed spaces, whereby said closed spaces alternatively form closed spaces having said holes.

38. The flywheel assembly according to claim 37, wherein said ends of each of said loop sections touch.

39. The flywheel assembly according to claim 37, wherein gaps separate said ends of said loop sections.

* * * * *